United States Patent
Falken

(10) Patent No.: US 9,821,891 B2
(45) Date of Patent: *Nov. 21, 2017

(54) REINFORCED SURF LEASH

(71) Applicant: Effekt LLC, Solana Beach, CA (US)

(72) Inventor: Robert Falken, Oceanside, CA (US)

(73) Assignee: Effekt LLC, Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/013,972

(22) Filed: Feb. 2, 2016

(65) Prior Publication Data

US 2016/0152308 A1    Jun. 2, 2016

Related U.S. Application Data

(63) Continuation of application No. 14/295,127, filed on Jun. 3, 2014, now Pat. No. 9,248,891.

(60) Provisional application No. 61/830,588, filed on Jun. 3, 2013.

(51) Int. Cl.
| | |
|---|---|
| *B63B 35/79* | (2006.01) |
| *B29C 65/00* | (2006.01) |
| *B29K 75/00* | (2006.01) |
| *B29L 31/52* | (2006.01) |

(52) U.S. Cl.
CPC .......... *B63B 35/7933* (2013.01); *B29C 65/00* (2013.01); *B29K 2075/00* (2013.01); *B29L 2031/5272* (2013.01); *B63B 2035/794* (2013.01)

(58) Field of Classification Search
CPC ..... B63B 35/79; B63B 35/7933; B63B 35/85; B63B 2035/794; B29D 23/00
USPC ........................................... 441/75; 428/35.7
See application file for complete search history.

(56) References Cited

U.S. PATENT DOCUMENTS

| | | |
|---|---|---|
| 4,176,705 A | 12/1979 | Russell et al. |
| 4,534,163 A | 8/1985 | Schuerch |
| 4,610,634 A | 9/1986 | Kimura |
| 5,875,543 A | 3/1999 | Fujimoto et al. |
| 6,500,039 B1 | 12/2002 | Underwood |
| 8,079,208 B2 | 12/2011 | Volpi |
| 8,834,221 B2 | 9/2014 | Cregan |
| 9,248,891 B2 | 2/2016 | Falken |
| 2009/0017244 A1 | 1/2009 | Martino et al. |
| 2015/0274265 A1 | 10/2015 | Falken |

*Primary Examiner* — Lars A Olson

(74) *Attorney, Agent, or Firm* — Mintz Levin Cohn Ferris Glovsky and Popeo, P.C.

(57) ABSTRACT

A surfboard leash apparatus is disclosed. The surf leash apparatus includes a cuff for attaching to a limb of a surfer, an attachment mechanism for attaching to a surfboard, and a leash cord connected between the cuff and the attachment mechanism. The leash cord includes an elastic fiber rope core having a predetermined amount of stretch, and an extruded thermoplastic urethane cord surrounding the elastic fiber rope core. The extruded thermoplastic urethane cord has an elasticity corresponding to the predetermined amount of stretch of the elastic fiber rope.

8 Claims, 2 Drawing Sheets

REINFORCED SURF LEASH

CROSS REFERENCE TO RELATED APPLICATIONS

The current application is a continuation of U.S. patent application Ser. No. 14/295,127, entitled, "Reinforced Surf Leash," filed Jun. 3, 2014, that in turn claims the benefit of priority under 35 U.S.C. §119(e) of U.S. Provisional Application Ser. No. 61/830,588, filed Jun. 3, 2013, titled "Reinforced Surf Leash." The current application is also related to co-pending U.S. patent application Ser. No. 14/738,574, filed Jun. 12, 2015 and entitled "Reinforced Surf Leash." The disclosures of each of the applications cited in this paragraph are incorporated herein by reference in their entireties.

BACKGROUND

The present invention relates to leashes used for surfboards or other similar devices such as bodyboards or paddleboards, and more particularly relates to a reinforced surfboard leash cord. Surfboard leashes are utilized as a means to connect surfers to their surfboards in a reliable manner with minimal drag. The main advantage of using a surfboard leash is that surfers don't easily become separated from the surfboards, thus alleviating the need to swim in order to recover the surfboard after a wipeout. If a surfer should become separated from a surfboard they could have to swim a considerable distance to recover the surfboard and risk fatigue or drowning. An additional advantage of using a surfboard leash is that the surfboard won't easily become dislodged and collide with other surfers causing damage or injury to either the surfboards or the surfers themselves.

Conventional surfboard leashes are comprised of a length of extruded thermoplastic urethane cord and connection parts such as molded joints, swivels, webbing, hook and loop fasteners, a leash string, and an ankle cuff. Typically, surfboard leashes are provided in the same length or slightly longer than the surfboard for which they are intended. Surfboard leashes are attached to surfboards on one end of the cord by connection parts and the other end securely connects the ankle cuff to the ankle of the surfer.

Extruded thermoplastic urethane leash cords have a minor amount of elasticity to reduce the brunt of the force applied to the surfer's leg when the surfer becomes momentarily separated from the surfboard after a wipeout. The cords are provided in varying diameters depending on the intended conditions of use. For example, conventional leash cords are provided in diameters such as 5 millimeters, 6 millimeters, or 8 millimeters. The thickness of the leash cord is directly proportional to the cords breaking strength. Typically, surfers use smaller diameter cords for small waves since small waves generally have less power and less force applied to the cord. Conversely, thicker diameter cords are utilized for big waves since big waves generally have more power and apply significantly more force to the cord. Additionally, the thickness of the leash cord is directly proportional to an increase in the amount of drag experienced while surfing. Increased drag can create a uncomfortable ride for the surfer or slow the desirable speed of the surfboard's acceleration in use.

Regardless of the diameter of the leash cord, extruded thermoplastic urethane cords can and do break during use. The breaking can be caused by many factors. For example, the surfboards fin can become entangled with the leash and slice the cord at high speed, which is known by surfers as "fin cuts". These "fin cuts" weaken the cord and reduce the breaking strength of the cord to the point of breakage under nominally applied force. Further, a bad formulation of the extruded TPU cord can result in weak spots within the cords construction that can cause breakage under the force of even traditionally small waves. Further still, surfing waves, regardless of size, can employ uncontrolled amounts of force to an object such as a surfboard since surfing waves are an unpredictable force of nature. As such, even a small wave might be able to apply enough force to break a thick surfboard leash cord. Thus, a need exists for surfboard leash cords that won't easily break due to the limitations mentioned above.

SUMMARY

This document presents surfboard leash cords with improved durability and reduced drag. According to one aspect, an extruded thermoplastic urethane surfboard leash cord is provided with a reinforced elastic fiber core.

In one aspect, a surfboard leash apparatus is disclosed. The surf leash apparatus includes a cuff for attaching to a limb of a surfer, an attachment mechanism for attaching to a surfboard, and a leash cord connected between the cuff and the attachment mechanism. The leash cord includes an elastic fiber rope core having a predetermined amount of stretch, and an extruded thermoplastic urethane cord surrounding the elastic fiber rope core. The extruded thermoplastic urethane cord has an elasticity corresponding to the predetermined amount of stretch of the elastic fiber rope.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a surfboard leash, and more particularly a surfboard leach with a reinforced cord that provides additional strength and protection against breakage, while also providing the necessary elasticity and/or elongation.

Figure 1:
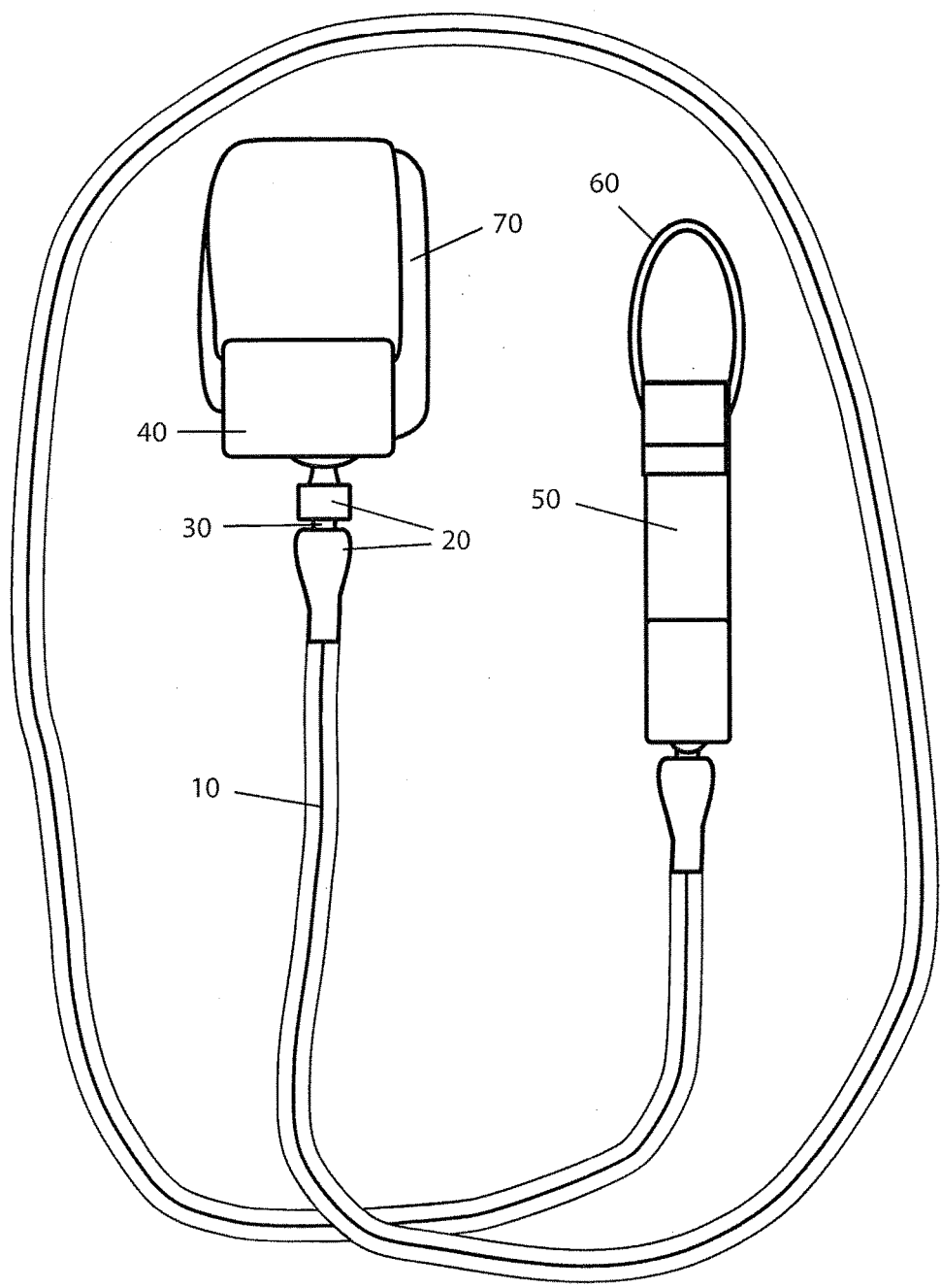
FIG. 1 provides a side view of a surfboard leash formed in accordance with an implementation.

Referring first to FIG. 1, a side view of a surfboard leash with reinforced cord 10 formed in accordance with an implementation is shown. The surfboard leash includes an extruded thermoplastic urethane reinforced cord 10, molded joints 20, swivels 30, webbing 40, hook and loop fasteners 50, a leash string 60, and an ankle cuff 70.

Figure 2:
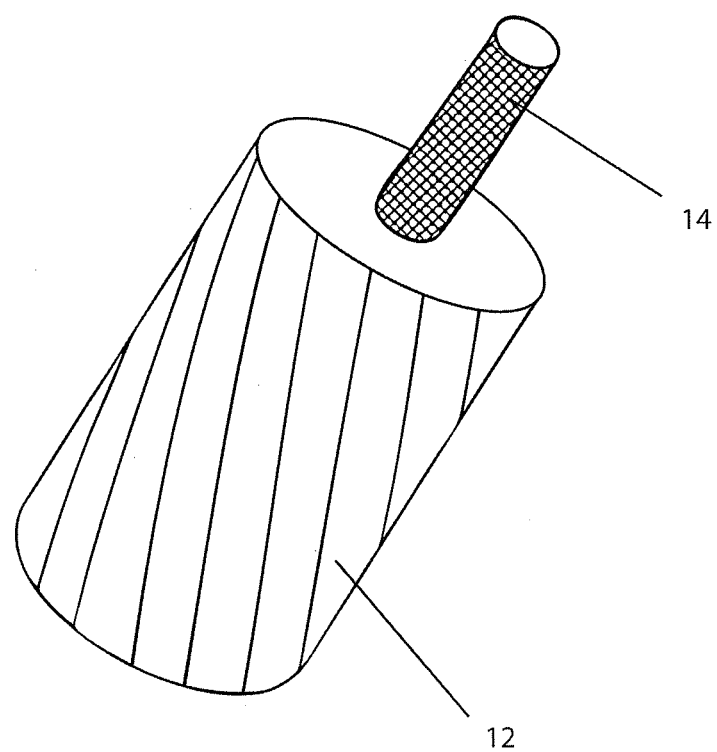
FIG. 2 illustrates a cross-sectional view of the reinforced surfboard leash cord implementation.

Referring to the cross-section shown in FIG. 2, the reinforced surfboard leash cord 10 includes an outer portion 12 of extruded thermoplastic urethane cord encapsulating an inner portion 14 of elastic fiber rope.

According to some implementations, various shore hardness's of thermoplastic urethane may be used to make the extruded thermoplastic urethane cord of the outer portion 12 in the surfboard leash cord of the present invention. Shore hardnesses, for example, less than 80 shore A, and preferably 85 to 90 Shore A are well suited for making the extruded thermoplastic urethane cord of the outer portion 12 of the present invention. Other shore hardness's may also be used to make the extruded thermoplastic urethane cord of the outer portion 12 of the present invention. According to other implementations, the inner portion 14 of the reinforced surfboard leash cord is formed of an elastic meta-aramid rope.

One alternative construction of the inner portion 14 of the reinforced surfboard leash cord, by example and without limitation, is a polypropylene/spandex-blended rope. In various examples of such constructions disclosed in the incorporated references, the rope includes between about 5% and about 20% by weight of the elastic fibers. Any suitably optimized rope composition can be used in a given situation.

Additionally, any suitable rope can be employed that exhibits mildly elastic properties of any suitable type to form a substantially continuous elastic core in the reinforced cord. The inner portion 14 can be assembled in any suitable arrangement. The rope fibers can be braided, plaited, or spun with elastic fibers to form the inner portion. Examples of suitable rope fibers include typical rope fibers, e.g., sisal, manila, jute, hemp, or other natural polyamide fibers; rayon, cotton, or other cellulosic fibers; nylon, polyester, polyethylene terephthalate, polypropylene, Ultra-High molecular weight polyethylene (UHMWPE), aramid, or other synthetic fibers. Alternatively, an elastic coating can be applied to a surface of a non-elastic rope to form the inner portion. In that latter case, the elastic fibers can be combined with the non-elastic fibers in any suitable way, including those described above or others not explicitly disclosed herein, and all such combinations shall fall within the scope of the present disclosure.

Although a few embodiments have been described in detail above, other modifications are possible. Other embodiments may be within the scope of the following claims.

The invention claimed is:

1. A surfboard leash apparatus comprising:
a cuff for attaching to a limb of a surfer;
an attachment mechanism for attaching to a surfboard; and
a leash cord connected between the cuff and the attachment mechanism, the leash cord having a central core of an elastic fiber rope having a predetermined amount of stretch, the elastic fiber rope consisting of braided aramid fibers and 5% to 20% by weight of elastic fibers braided with the braided aramid fibers, the leash cord further having an outer portion of thermoplastic urethane extruded over the central core of the elastic fiber rope, the thermoplastic urethane having an elasticity corresponding to the predetermined amount of stretch of the core of elastic fiber rope.

2. A surfboard leash apparatus comprising:
a cuff for attaching to a surfer's body;
an attachment mechanism for attaching to a surfboard; and
a leash cord connected between the cuff and the attachment mechanism, the leash cord comprising a central elastic fiber rope core consisting of an aramid, and an extruded thermoplastic urethane surrounding the central elastic fiber rope core.

3. A surfboard leash apparatus comprising:
a cuff for attaching to a limb of a surfer;
an attachment mechanism for attaching to a surfboard; and
a leash cord connected between the cuff and the attachment mechanism, the leash cord comprising:
an elastic fiber rope core consisting of an aramid rope and being woven to provide a predetermined amount of stretch; and
a thermoplastic urethane cord extruded over the elastic fiber rope core, the extruded thermoplastic urethane cord having an elasticity corresponding to the predetermined amount of stretch of the elastic fiber rope core.

4. The apparatus in accordance with claim 3, wherein the aramid rope is connected directly to the attachment mechanism.

5. The apparatus in accordance with claim 3, wherein the elastic fiber rope is connected directly to both the attachment mechanism and the cuff.

6. A method of making a reinforced surfboard leash, the method comprising:
providing an elastic fiber rope having a predetermined amount of stretch, the elastic fiber rope consisting of braided aramid fibers and 5% to 20% by weight of braided elastic fibers that are braided with the aramid fibers; and
extruding a thermoplastic urethane over the elastic fiber rope to form a leash cord in which the elastic fiber rope forms a central core, the thermoplastic urethane having an elasticity corresponding to the predetermined amount of stretch of the core of elastic fiber rope.

7. The method in accordance with claim 6, further comprising connecting both the core of the elastic fiber rope and the thermoplastic urethane to a cuff for attaching to a limb of a surfer.

8. The method in accordance with claim 7, further comprising connecting both the core of the elastic fiber rope and the thermoplastic urethane to an attachment mechanism for attaching to a surfboard, to form the reinforced surfboard leash.

* * * * *